Sept. 6, 1938.  C. BOCCA ET AL  2,129,195
COLOR FILTER
Filed April 19, 1937
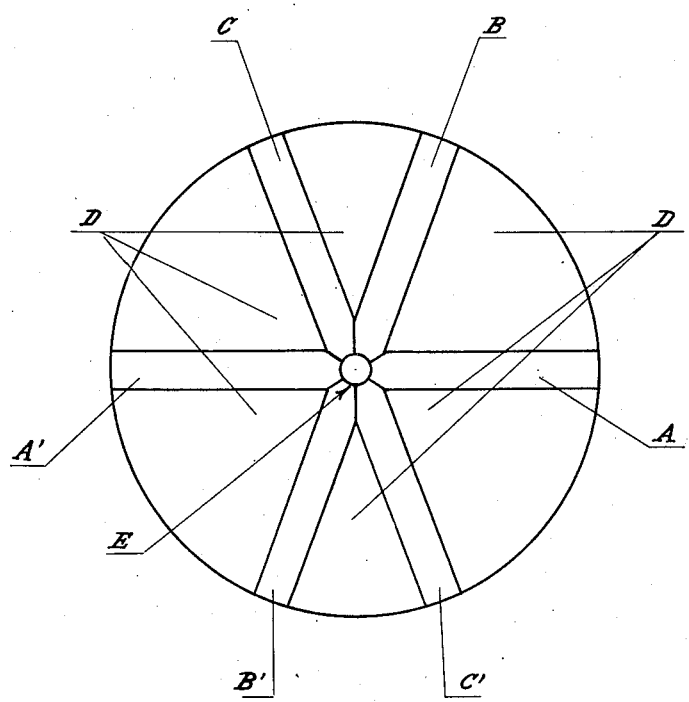
C. Bocca & L. Amati
Inventors Patented Sept. 6, 1938

2,129,195

UNITED STATES PATENT OFFICE 2,129,195

COLOR FILTER

Carlo Bocca, Vigevano, and Luigi Amati, Padova, Italy

Application April 19, 1937, Serial No. 137,838
In Italy April 20, 1936

1 Claim. (Cl. 88—16.4)

The present invention relates to improvements introduced in the method described in United States Patent No. 2,050,417 for obtaining in projection images in colors.

It is known that operating according to this method, the image in colors which is obtained in projection is formed solely by the light which has been diffracted by rulings which, on the projection diapositive, represent the images of diffraction gratings printed together with partial diapositives. In order to obtain in projection a clear and strongly luminous image it is therefore useful to employ projection diapositives upon which the images of the lines of the gratings are represented by reliefs; considering furthermore that the quantity of light diffracted is greater the higher are these reliefs, there is an interest in obtaining them as high as possible.

It has been observed however, that, increasing the height of the reliefs in question, one encounters a drawback due to the fact that the quantity of light diffracted by the various zones of the projection diapositive does not increase in equal measure, so that the image in colors which is obtained in projection has in its various parts a different luminosity, it increases in fact in greater measure in those zones of the projection diapositive in which the diffraction grating has been printed in only one direction (zones to which correspond parts of the subject colored in one of the primary colors) whilst it increases in lesser measure in those zones of the diapositive itself in which the grating has been printed in a greater number of directions (zones to which correspond white or faintly colored parts of the subject). It follows that in the image obtained in projection the white parts and those faintly colored appear less luminous than those colored in one of the primary colors.

To avoid this drawback it has already been proposed to project, together with the diapositive destined to give the image in colors, also a positive image in black and white of the subject reproduced. In this manner the luminosity of the white parts and of those faintly colored remains practically unaltered, whereas one noticeably diminishes that of the parts colored in one of the primary colors. The image obtained in projection thus has a uniform luminosity which, however, is generally too low.

The object of the present invention is a method which permits of increasing the luminosity of the white and faintly colored parts of the images obtained in projection so that operating according to the present method it is possible to employ projection diapositives upon which the lines of the gratings are represented by comparatively high reliefs and to obtain in projection images highly luminous and having uniform luminosity.

To render more easily comprehensible how this purpose is attained, we would remark firstly that when one projects a projection diapositive obtained according to the patent quoted above, part of the light undergoes more than one diffraction. Let us consider, for example, a projection diapositive obtained with a process of trichromatic selection and upon which are thus reproduced in relief three bundles of parallel lines, so arranged that the lines belonging to any one of the three bundles cuts, at a given angle, the lines belonging to the other two bundles. We shall call these bundles "gratings". (Similar considerations to those we are expounding in the case of a trichromatic selection can be applied to processes of other selections than trichromatic). It is known that in certain zones of the projection diapositive under consideration, no grating will be impressed; in others there will be impressed one, in others two, in others three gratings.

As known, the light arriving upon those zones of the projection diapositive on which no grating is impressed is not diffracted, whereas a part of the light arriving upon the zones on which only one grating is impressed undergoes diffraction. Such light is however diffracted only once.

Of the light reaching those zones of the projection diapositive on which are impressed two gratings part is not diffracted; another part is diffracted by the lines of each of the two gratings. However not all of this diffracted light goes to form the diffracted images which form along the two directions perpendicular to the lines of the two gratings under consideration. Part of the light diffracted by the first of the two gratings is in fact diffracted by the second grating, giving rise to the formation of other diffracted images which might be termed "images of second diffraction". The diffracted images of second diffraction are disposed symmetrically in respect of the diffracted images of first diffraction produced by the first grating and they are aligned according to a direction perpendicular to the lines of the second grating; so that it can be said that the diffracted images created by the first grating constitute the central images of the systems of diffracted images which the second grating creates by diffracting for a second time part of the light which has already been diffracted by the first grating. The same occurs with the light which, upon reaching the projection diapositive, is diffracted by the second grating and part of which is diffracted a second time by the lines of the first grating.

As for the zones upon which are impressed three gratings it is obvious that part of the light which reaches them will not be diffracted, part will be diffracted only once, part twice and part three times.

From what we have stated it is evident (and on the other hand our experiments have confirmed it) that in the case of trichromatic selection the quantity of light which can undergo more than one diffraction, giving cause to the formation of images of second and third diffraction, is greater in the zones of the projection diapositive which correspond to the white parts or the faintly colored parts, of the subject in which zones, as is known, the projection diapositive carries printed upon it all three of the gratings. When a projection diapositive is projected in the manner described in the patent above quoted, also the images of second and third diffraction form on the colored sectors of the colored filter employed, so that a large part of the light (practically about ⅔) which forms these images is intercepted by said sectors and does not reach the screen, and it is precisely owing to this strong interception of light that the white parts and those faintly colored appear less luminous than the others.

According to the present invention for the projection of projection diapositives, instead of employing a filter consisting of so many pairs of sectors of the same color and diametrically opposed as there are primary colors in the process of polychromatic selection employed, as specified in the patent above quoted, we employ a filter whose colored zones have only the dimensions necessary to allow the complete formation thereon of diffracted images of first diffraction, the remainder of the filter being perfectly transparent and colorless, excepting the central part which is provided with an opaque disc which intercepts the light forming the non-diffracted image of the luminous source. In the filter employed operating according to the present invention, there are thus as many pairs of zones of the same color and diametrically opposed, as there are primary colors in the polychromatic selection employed; as stated in the patent above quoted this filter is placed in the plane on which form the images of the luminous source and its colored zones are so placed that the images of first diffraction formed by the light diffracted by each of the gratings will form upon zones having the same color as the filter employed in taking that particular partial negative form the printing of which was obtained the partial diapositive which was printed together with the grating under consideration.

In the accompanying drawing, the figure shows one of the forms which, operating according to the present invention, can be given to the filter. The filter destined to the projection of a projection diapositive obtained according to a process of trichromatic selection employs as primary colors: red, green and violet. In the filter shown in the figure the two zones A and A' are red, the zones B and B' are green and the zones C and C' are violet, while the six zones D are transparent and colorless. At the center of the filter is the opaque disc E.

Operating according to the present invention the projection screen receives, in addition to the colored light, also some white light, and it may thus occur that the coloring of the image obtained in projection will appear slightly attenuated; this is corrected by coloring the zones of the filter with slightly more intense colors than the image must have.

Having now particularly described and ascertained the nature of our said invention and in what manner the same is to be performed, we declare that what we claim is:

For a method of producing projected pictures in natural colors which comprises preparing by known methods a series of partial positive images of polychromatic selection of the subject, printing upon a light-sensitive surface through a parallel-lined diffraction grating one of the partial positives, printing in succession the remaining partial positives, on the same light-sensitive surface and with the images in register through a parallel-lined diffraction grating with the lines thereof at an angle to the lines in the former printing steps, illuminating the resultant complete positive with a light beam issuing from a luminous source, forming on a plane a non-diffracted real image of the luminous source, sets of diffracted images of luminous source formed by light which has been diffracted once, sets formed by light which has been diffracted twice and sets formed by light which has been diffracted three times, obturating the light forming the non-diffracted image and forming with the diffracted light an image of the subject, a filter having at its center an opaque disc, which intercepts all the non-diffracted light and as many pairs of transparent zones of the same color and diametrically opposed as there are primary colors in the process of polychromatic selection employed, while the zones between colored zones are colorless as well as transparent, the colored zones being of such dimensions as to permit the formation upon themselves of the entire diffracted images of the luminous source formed by light which has been diffracted only once.

CARLO BOCCA.
LUIGI AMATI.